July 7, 1953 R. STEVENSON Re. 23,682

UNLOADING VALVE

Original Filed June 27, 1944

INVENTOR
Robert Stevenson
BY Parlow & Parlow
ATTORNEYS

Reissued July 7, 1953 Re. 23,682

UNITED STATES PATENT OFFICE 23,682

UNLOADING VALVE

Robert Stevenson, East Greenwich, R. I., assignor to Merit Engineering, Inc., a corporation of Rhode Island Original No. 2,545,712, dated March 20, 1951, Serial No. 542,411, June 27, 1944. Application for reissue March 18, 1953, Serial No. 343,273

11 Claims. (Cl. 137—108)

Matter enclosed in heavy brackets [ ] appears in the original patent but forms no part of this reissue specification; matter printed in italics indicates the additions made by reissue.

This invention relates to an unloading valve for use in a system in which the fluid pressure may be maintained without constant action of the fluid pump.

One of the objects of this invention is to provide a valve through which fluid may pass to supply pressure for transfer of the fluid and yet short circuit the fluid flow back to the reservoir whereby the energy required by the pump will be relieved.

Another object of this invention is to provide a valve in which the fluid passing through the valve will automatically short circuit when a predetermined pressure is reached and thereby relieve the pump which operates on the valve from the work which it has to do when this short circuiting arrangement is not cut in.

Another object of this invention is to provide a quick operating valve and consequently one in which the control of the system may be closely obtained.

Another object of the invention is to provide no sliding packing which is exposed to the high pressure fluid when the valve is in unloading position and it is desired to maintain the system at high pressure without subjecting the pump to high working conditions.

Another object of the invention is to provide two rigid seats for the valve against which the high pressure works.

Another object of this invention is to provide an arrangement whereby the valve may be easily and quickly adjusted.

Another object of this invention is to provide a cartridge which may be removed from the valve without disconnecting the valve from its communicating conduits.

Another object of this invention is to provide a removable cartridge which may be preadjusted and merely insert it into the valve for a predetermined value of operation of the valve or which may be interchanged with another cartridge for a change of such predetermined adjustment.

With these and other objects in view, the invention consists of certain novel features of construction, as will be more fully described and particularly pointed out in the appended claims.

In proceeding with this invention I provide a valve body which has a port to connect with a high pressure supply and a port to connect with the work with a passageway between these ports. A low pressure port is also provided in the valve with a conduit connecting with a passageway for the high pressure fluid. These passageways are controlled by a main valve with a check valve therein by an arrangement such that the high pressure will press upon opposite ends of the valve, the surfaces of said valve which are exposed to the pressure being of such relative diameters that the unbalanced pressure due to the differential of the diameters determines the direction in which the valve will be moved. A spring supplements the larger diameter and the pressure on this larger diameter is so controlled that when pressure is permitted upon this larger diameter the valve will be closed but when the control acts to remove this pressure on this larger diameter then the pressure on the smaller diameter will overcome the spring and cause the valve to open. This control is by a predetermined arrangement so that automatic operation will be had, the arrangement being such that the main valve will open at a predetermined high pressure and will close at a predetermined lower pressure. When the main valve is open fluid pressure may short circuit to the low pressure port *without being spring opposed* and less work need be done by the means which supply the fluid to the high pressure port *and also there is no valve vibration.*

Figure 3:
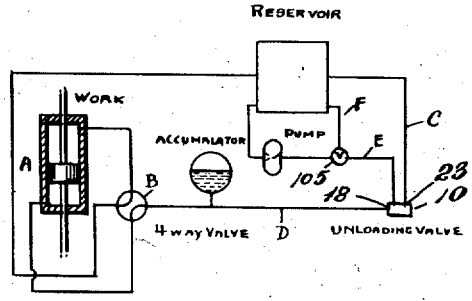
Fig. 3 is a diagrammatic view illustrating a system employing the unloading valve.

A system in which the valve is used is illustrated in Fig. 3 wherein a reservoir is shown from which a pump takes liquid for supplying it to a cylinder A at either end of the cylinder by reason of the four-way valve B. An accumulator may be in the line for maintaining a somewhat equal pressure. As the fluid is supplied at one end of the cylinder to move the piston therein, fluid is extracted from the opposite end of the cylinder and returned to the reservoir. My unloading valve 10 is located in this line between the pump and the work in the location illustrated in this figure and a return line C is provided from another port of the valve to the reservoir. One port 20 of the valve is connected to the pump by conduit E, a second port 18 is connected to the work by conduit D and another port 23 is connected by the return line C to the reservoir. The supply from conduit E will be directed to either conduit C or D. In operation we may assume that it is desired to maintain from 800 pounds to 1000 pounds pressure for the work required. This pressure is only needed when there is an actual movement of the piston in the cylinder. Consequently when no movement occurs the pressure rapidly builds up. When this pressure builds up to 1000 pounds my unloading valve will automatically operate so as to switch the circulation from the work to the by-pass through conduit C back to the reservoir, thus reducing the load on the pump considerably.

With reference to the drawings, 10 designates a valve body formed of a block of metal which has a main bore 11 for the main valve threaded as at 12 and enlarged as at 13 at one end while more restricted portions 14 and 16 provide shoulders 15 and 17. The portion 16 of this bore provides a port 18 for a high pressure discharge which may be threaded as at 19 for connection of some suitable conduit such as D leading to the work. The body may have an outwardly projecting boss 22 in which a pressure supply port 20 is located which is provided with internal threads 21 for connection to some suitable conduit E to the pump and which communicates with the bore 11. A low pressure port 23 is also provided in this boss having threads 24 for connection to some suitable conduit C returning to the reservoir. This port also connects with the main bore 11.

A smaller bore 25 is also provided in the body 10, the axis of which is parallel to the bore 11. This bore is of the same size throughout its extent from one end of the body to the other and receives the complete unit designated generally 26 and shown by itself in Fig. 2 in this bore which will be more fully hereinafter described. The bore 25 connects with the main bore through a passage 27 adjacent one end and through a passage 28 adjacent the other end of the valve body.

In the main valve bore 11, I position a block 30 of generally tubular formation [which at its end 31] *and having a portion of the bore thereof reduced as at 30'. The end 31 of the block* engages the shoulder 17, while a soft packing 32 serves to seal this end of the block in the bore 11. A plurality of openings 33 extending laterally of the block communicate with the annular chamber 34 formed by the reduced portion of the block between itself and the bore 11 at a location so that this annular chamber communicates with the high pressure port 20 *and the bore 30'*. A suitable soft packing 35 serves to seal the block with the bore 11 on the opposite side of this annular chamber 34. A valve seat 36 is provided at one end *of the reduced bore 30' against which the main valve is seated to close communication between the supply port and the return port. A valve seat 36' is provided at the other end of the bore 30'. The bore of larger diameter* of this block [at the junction of the inner surface of the bore and against which the main valve is seated. The inner surface at the opposite end of this block] designated 37 provides a sliding guide for one end of the valve.

A sleeve 38 has threaded engagement with the threads 12 of bore 11 and its end engages the block 30 so as to maintain this block firmly against the shoulder 17 rigidly in place in the valve body. The sleeve has an internal bore 39 of a size substantially larger in diameter than the diameter of the valve seat 36 and in this bore is located the main valve 40.

The main valve 40 has a tapered surface 41 to engage the valve seat 36 and a flange 42 to slidingly engage the bore 39 of the sleeve 38. A soft packing 43 is provided to prevent the escape of fluid between these engaging surfaces. The valve is also provided with an end portion 44 slidingly engaging the surface 37 of the block 30 and connected to the reduced end of the valve by a stud 45 extending axially through the valve and secured by nut and check nut 46 and 47. *This end portion 44 has a surface area normally exposed to the supply pressure in the bore 37 which is connected to the supply 20 through the smaller bore 30' which provides a valve seat 36' with which the end portion 44 engages when the main valve 40 is off its seat 41. When the main valve is closed on the seat 41 the effective area of the end portion 44 is balanced.* The valve is provided with a central recess 48 for the reception of a coil spring 49 which acts to force the valve toward its seat *41* by engagement with the abutment surface 49 of the plug 50.

This plug 50 is threaded as at 51 into the end of the sleeve 38. The hollow interior of the reduced portion of this plug connects with the annular chamber 52 between the head of the plug and the end of the sleeve by reason of a plurality of openings 53 extending through the stem of the plug. This annular chamber 52 is in communication with the conduit 28 so that liquid may be supplied through this passage 28 to the chamber 54 on the enlarged end of the valve. A suitable soft packing seal 55 is provided in the sleeve at one side of the annular chamber 52 and a soft packing 56 is provided in the plug on the other side of the annular chamber 52 to prevent the escape of the high pressure fluid along these surfaces.

The unit 26 which is inserted in the bore comprises a sleeve 60 of a size to slide within the bore 25. The sleeve is reduced in diameter at certain points along its extent as at 61 so as to provide an annular chamber 62 between it and the bore 25. Openings 63 from this chamber 62 communicate with the bore 64 and bore 65 in the sleeve, which latter bore is in communication with the longitudinally extending channel or recess 66 which in turn communicates through opening 67 with the annular chamber 68 surrounding the sleeve 38 which is in communication with the low pressure port 23 and also the surface of the valve between the valve seat and the head or flange 42. Another recess 70 in this sleeve communicates with the bore 65 through the conduit 71 and through port 72 with the space about the plug 73 and thence through the central channel 74 with the annular chamber 75, through openings 76', which annular chamber 75 is in connection with the conduit 28 and the chamber 52.

The upper end of the bore 65 provides a valve seat 76 against which the inclined surface 77 of a valve 78 may engage to close this bore 65. The flared end 79 of the valve engages the bore 64 and is guided along this surface. Openings 80 through this flared portion of the valve serve for free communication of the high pressure fluid to the inner conical surface of this flared portion and serve to balance all portions of this end of the valve except the diameter which engages the valve seat. The valve immediately below the valve seat is of reduced diameter but at a point below conduit 71 the valve has a portion 81 slidingly engaging the bore 65. The end of the valve is reduced as at 82 and 83 to project through an opening 84 in a wall which extends laterally across the sleeve. This opening 84 serves as a passage for fluid to the recess 66 and is closed by a ball 85 which is pressed by the plunger 73 to seating position through means of a coil spring 86 having one end engaging the abutment 87 threaded as at 88 for movement longitudinally of the bore 89.

The sleeve 60 is internally threaded at its opposite ends as at 90 and 91 into which plugs 92 and 93 may threadingly engage. The heads of these plugs are sealed by soft packings 94 and 95 which are located beneath the heads of these plugs and the ends of the sleeves 60. These closure plugs also serve to abuttingly engage the outer end of the body 10 where the bore 25 emerges to the end surfaces. Slots 96 in these plugs serve to assist in turning them into position while an opening 97 may be used for wiring to the opening 98 in the flange of the closure 50 so to prevent relative turning of these parts with reference to each other and to the body.

The guided end portion of the main valve is provided with a check valve 100 which is forced to its seat by a spring 101 abutting the perforated plate 102 secured in the end of the main valve. Pressure is communicated from the inlet high pressure port 18, also by reason of the conduits 27, 65, 71, 70, 72, 74, 76, 75, 28, 52, 53 and 54, high pressure is transferred from one end of the main valve 40 on one side of the valve seat 36 to the other end of the valve at the other side of the valve seat 36. The diameter of the valve head 42 at one end of the valve determines the closing pressure which will be applied on the valve which is assisted by the spring 49. Pressure exerted tending to open this valve presses on an area of the valve equal to the diameter of the seat 36. The remainder of this end of the valve is all in balanced relation. A complete balance may be provided using pressure of spring 49 alone for closing.

Figure 1:
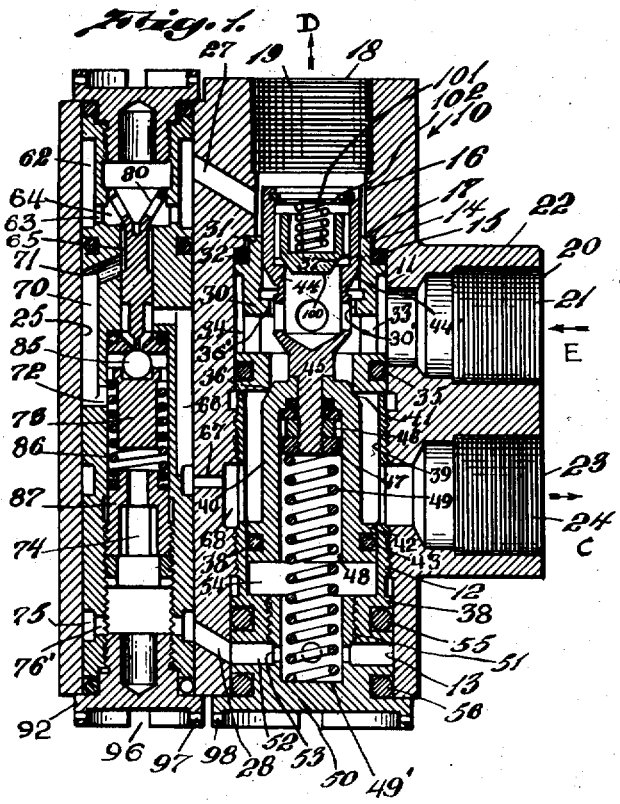
Fig. 1 is a sectional view through the valve.
Figure 2:
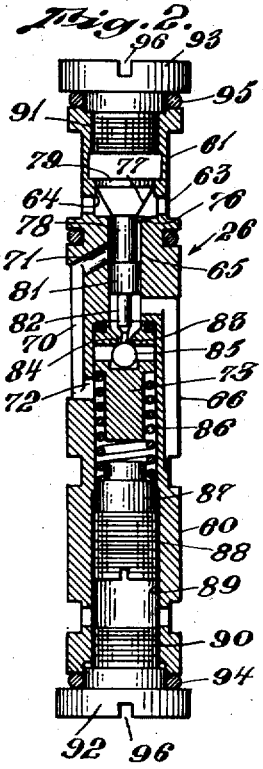
Fig. 2 is a sectional view through a removable unit which may be inserted in the valve body.

It is so arranged that if the pressure on the area 42 of the valve is cut off, then the pressure on the opposite end of the valve will overcome the pressure of the spring 49 and open the valve. The check valve 100 prevents pressure from the line D escaping to the return C. The automatic cut-off of the pressure on the area 42 is provided by the pilot valve in the bore 25 and which is a separate unit as shown in Fig. 2.

The ball 85 normally closes the opening 84 and at the same time the spring which forces this ball to its seat also forces the valve 78 from its seat 76 so that it is normally open.

When the ball 85 is seated, the surface area thereof exposed to high pressure liquid is such as to provide an unbalanced force acting on the ball in a direction tending to move the same towards its seat. The surface area of the ball exposed to this force is an area equal to the area of the opening 84. The spring 86 supplements this force. The surface area of the valve 78 subjected to pressures tending to slidably move the same toward or from its seat is balanced such that the effective area thereon exposed to pressure tending to move the same to its seat, when the ball 85 is seated, is an area equal to the area of the bore 65 minus the area of the opening 84.

The adjustment of the spring 86 is such that it will yield when the pressure reaches top limit of the range. This may be assumed to be 1,000 pounds. Such pressure on the valve 78 will move the same to its seat against opposing pressure on the ball 85 and resistance of spring 86. With the ball valve 85 removed from its seat, fluid will escape through opening 84 and will reduce the pressure opposing the valve 78. With the valve 78 seated, the surface area exposed to pressures tending to oppose moving the same from its seat is equal to the total area of the bore 65 and will maintain the valve closed against the action of spring 86.

When the ball 85 is forced from its closed position liquid may escape through the opening 84 to the recess 66, thence through the opening 67 through the annular chamber 68, and thence to the port 23 and low pressure side of the valve. The closure of the valve at 76 prevents high pressure fluid from being supplied to chamber 54 and area 42 of the head of the valve. Thus, by the absence of this pressure the main valve will open and the incoming fluid from conduit E will pass from the port 20 past the valve seat 36 to the port 23 and through conduit C back to the reservoir and this condition will occur until the pressure in the work line drops to an extent, say 800 pounds, when the spring 86 will overcome this pressure, open the valve 77, close valve 85, [and open the pilot valve] and permit liquid to be supplied to the chamber 54 under the higher pressure and consequently press upon this larger diameter of the valve at this end to close the same. Thus the opening pressure and the closing pressure are inversely proportional to the opening area and closing area.

*Upon movement of main valve 40 from the valve seat 36 the tapered surface 44′ will move to engage valve seat 36′, the balanced condition on portion 44 is changed. The larger bore 37 is now shut off from the supply pressure, leaving only the diameter of the bore 30′, which provides the valve seat which the tapered surface 44′ engages, exposed to the supply pressure. Thus, the difference between the diameters of the larger bore 37 and the smaller bore 30′ is at once subtracted from the effective pressure on the portion 44, tending to move the valve 40 upwardly or toward closed position. Further, the pressure upon the valve 40 in the diameter of the bore 39 is subjected to the supply pressure. This supply pressure, however, may decrease materially leaving the discharged pressure acting through the diameter of the bore 37 upon the end portion 44, tending to hold the main valve 40 off its seat or in open position and which is opposed only by the spring 49. A free flow from port 21 to port 23 will be had even at low pump pressures without any valve vibration.*

A relief valve 105 may be placed in the line E with a return connection F to the reservoir.

I claim:

1. In an unloading valve having a body provided with a supply port, a discharge port and a return port communicating with the supply port, a main valve normally seated to close communication between said supply port and return port and subjected on one side thereof to the pressure at the supply port tending to unseat said valve and on the other side to the pressure at the discharge port tending to seat said valve, a check valve between the supply and discharge ports for blocking the return of fluid from said discharge port so proportioned with reference to the main valve as to area and spring pressure as to be unseated when said main valve is seated and seated when said main valve is unseated, a normally unseated second valve for controlling the said fluid pressure from said discharge port which acts on said main valve, said second valve being subjected on one side to the pressure at the discharge port tending to seat said second valve to cut off said pressure from said discharge port which acts on said main valve, a vent conduit in said body communicating with said return port for draining upon the seating of said second valve the said pressure from said discharge port which acts on said main valve for creating a differential pressure condition across said main valve to unseat the same in response to the said pressure from the supply port which acts thereon, a third valve for controlling said vent conduit arranged to be normally seated and subjected on one side to the pressure at the discharge port tending to move the same to closed position and engaged on the other side by said second valve to be unseated thereby upon seating of said second valve and a spring supplementing the said fluid pressure acting on said third valve to oppose closing of said second valve and adjustable means to predetermine the fluid pressure range at which said second valve will be seated or unseated.

2. In an unloading valve, a supply port, a discharge port, a passage for fluid between said ports, a return port communicating with the supply port, a conduit therefrom to said passage providing a valve seat, a main valve arranged to be normally seated on said seat and subjected on one side thereof to the pressure at the supply port tending to unseat said main valve and on the other side to the pressure at the discharge port tending to seat said valve, a check valve between the supply and discharge ports for blocking the return of fluid from said discharge port so proportioned with reference to the main valve as to area and spring pressure as to be normally unseated when said main valve is seated and seated when said main valve is unseated, a second conduit for supplying fluid from the discharge port to said main valve, a second valve in said second conduit normally unseated and subjected on one side thereof to the fluid pressure in said second conduit tending to seat the same to close said second conduit to cut off the fluid from said discharge port to said main valve, a vent conduit from said second conduit to said return port to drain fluid from said second conduit upon seating of said second valve to create a differential pressure condition across said main valve to unseat the same in response to the said pressure from the supply port which acts thereon, a third valve for controlling said vent conduit arranged to be normally seated to close said vent conduit and subjected on one side thereof to the fluid pressure in said second conduit tending to seat said third valve and engaged on the other side by said second valve to be unseated thereby upon seating of said second valve, and a spring supplementing the said fluid pressure which acts on said third valve to oppose the seating of said second valve and adjustable to predetermine the fluid pressure range at which said second valve will be seated and said third valve opened.

3. In an unloading valve, a supply port, a discharge port, a passage for fluid between said ports, a return port communicating with the supply port, a conduit therefrom to said passage providing a valve seat, a main valve arranged to be normally seated on said seat and subjected on the high pressure side of said seat to the pressure at the supply port tending to unseat said valve and on the low pressure side of said seat to the pressure at the discharge port tending to seat said main valve, a check valve in said main valve located between the supply and discharge ports for blocking the return of fluid from said discharge port so proportioned with reference to the main valve as to area and spring pressure as to be seated when said main valve is unseated and unseated when said main valve is seated, a spring on the low pressure side of said seat urging said main valve to seated position, a second conduit from said passage to supply fluid from the said discharge port to said main valve, a second valve in said second conduit normally unseated and subjected on one side thereof to the fluid pressure in said second conduit tending to seat said second valve to close said second conduit to cut off the fluid from said discharge port to said main valve, a vent conduit from said second conduit to said return port to drain fluid from said second conduit upon seating of said second valve to create a differential pressure across said main valve to unseat the same in response to the said pressure from the supply port which acts thereon, a third valve for controlling said vent conduit arranged to be normally seated and engaged on one side thereof by said second valve and unseated thereby upon the seating of said second valve, said third valve being subjected on the other side thereof to the fluid pressure in said second conduit tending to seat the same and oppose seating of said second valve, spring pressure urging said third valve to seated position and adjustable to predetermine the pressure range at which said second valve will be seated and said third valve unseated.

4. In an unloading valve, a supply port, a discharge port, a passage for fluid between said ports, a return port communicating with the supply port, a conduit therefrom to said passage providing a valve seat, a main valve engaging said seat and arranged to be normally seated and subjected on the high pressure side of said seat to the pressure at the supply port and on the low pressure side of said seat to the pressure at the discharge port, said valve having a portion thereof slidably extending into said passage and provided with a bore therein communicating with said supply port and said discharge port, a check valve in said bore between the supply and discharge ports for blocking the return of fluid from said discharge port so proportioned with reference to the main valve as to area and spring pressure as to be seated when said main valve is unseated and unseated when said main valve is seated, a spring on the low pressure side of said seat urging said main valve to seated position, a second conduit from said passage to supply fluid from said discharge port to said main valve, a second valve in said second conduit arranged to be normally unseated and subjected on one side thereof to the fluid pressure in said second conduit tending to seat the same to close said second conduit to cut off the fluid from said discharge port to said main valve, a vent conduit from said second conduit to said return port to drain fluid from said second conduit upon seating of said second valve to create a differential pressure across said main valve to unseat the same in response to the said pressure at the supply port which acts thereon, a third valve for controlling said vent conduit arranged to be normally seated and engaged on one side thereof by said second valve and unseated thereby upon the seating of said second valve and subjected on the other side thereof to fluid pressure in said second conduit tending to seat said third valve to oppose seating of said second valve, spring pressure urging said third valve to seated position and adjustable to predetermine the pressure range at which said second valve will be seated and said third valve unseated.

5. In an unloading valve, a supply port, a discharge port, a passage for fluid between said ports, a return port communicating with the supply port, a conduit therefrom to said passage providing a valve seat, a main valve engaging said seat and arranged to be normally seated and subjected on the high pressure side of said seat to the pressure at the supply port and on the low pressure side of said seat to the pressure at the discharge port, said valve having a portion thereof slidably extending into said passage and provided with a bore therein communicating with said supply port and said discharge port, a check valve in said bore between the supply and discharge ports for blocking the return of fluid from said discharge port so proportioned with reference to the main valve as to area and spring pressure as to be seated when said main valve is unseated and unseated when said main valve is seated, said portion having an abutment thereon and a spring acting between said abutment and said check valve urging said check valve to seated position, a spring on the low pressure side of said seat urging said main valve to seated position, a second conduit from said passage to supply fluid from said discharge port to said main valve, a second valve in said second conduit arranged to be normally unseated and subjected on one side thereof to the fluid pressure in said second conduit tending to seat the same to close said second conduit to cut off the fluid from said discharge port to said main valve, a vent conduit from said second conduit to said return port to drain fluid from said second conduit upon seating of said second valve to create a differential pressure across said main valve to unseat the same in response to the said pressure at the supply port which acts thereon, a third valve for controlling said vent conduit arranged to be normally seated and engaged on one side thereof by said second valve and unseated thereby upon the seating of said second valve and subjected on the other side to fluid pressure in said second conduit tending to seat said third valve to oppose seating of said second valve, spring pressure urging said third valve to seated position and adjustable to predetermine the pressure range at which said second valve will be seated and said third valve unseated.

6. In an unloading valve having a body provided with a supply port, a discharge port and a return port communicating with the supply port, a main valve normally seated to close communication between said supply port and return port and subjected on one side thereof to the pressure at the supply port tending to unseat said valve and on the other side thereof to the pressure at the discharge port tending to seat said valve, a check valve between the supply and discharge ports for blocking the return of fluid from said discharge port so proportioned with reference to the main valve as to area and spring pressure as to be unseated when said main valve is seated and seated when said main valve is unseated, a conduit in said body for supplying fluid from said discharge port to said main valve, a vent conduit from said conduit to said low pressure port, a valve unit in said conduit including a sleeve provided with passages therein communicating with said discharge port, main valve and said vent conduit, a second valve in said unit arranged to be normally unseated and subjected on one side thereof to the fluid pressure in said conduit tending to seat said second valve to close said passages to cut off fluid from said discharge port to said main valve, a ball valve in said unit arranged to be normally seated to control the said vent conduit and subjected on one side thereof to the fluid pressure in said conduit tending to seat the same and engaged on the other side thereof by said second valve to be unseated thereby upon the seating of said second valve to drain fluid in said conduit from said main valve to create a differential pressure across the main valve to unseat the same in response to the said pressure at the supply port which acts thereon, and a spring urging said ball valve to seated position and oppose seating of said second valve and adjustable to predetermine the pressure range at which said second valve will be seated or unseated.

*7. In an unloading valve, a supply port, a return port, a conduit between said ports providing a main valve seat therealong, a discharge port, a second conduit between said supply port and discharge port providing a second valve seat therealong, a member having closure for said main valve seat and presenting a diameter greater than the diameter of said main valve seat on the return port side of the seat and subjected to the discharge port pressure urging the member to cause the main valve to seat, and said member having a second closure for said second valve seat and presenting a diameter greater than the diameter of said second valve seat on the discharge side of the seat and subjected to the discharge port pressure urging the member to the second valve seat when in engagement therewith, a spring urging said member to normally engage the main valve seat and open the second valve seat, second valve means for controlling the pressure at the discharge port acting on the return port side of said member for creating a differential pressure condition across said member to unseat the same in response to the pressure at the discharge port acting on said member on the return port side thereof and seating said second closure on said second valve seat, whereby the difference in diameter of the second valve seat and the greater diameter on the discharge port side thereof is subtracted from the area subjected to the supply port pressure.*

*8. In an unloading valve, a supply port, a discharge port and a return port, a main valve normally seated to close communication between said supply port and return port and subjected on the low pressure side thereof to the pressure at the discharge port tending to seat said valve and subjected at the other side thereof to the pressure at the supply port tending to unseat said valve, a spring urging said valve to seated position, said valve having additional opposite surface areas thereon exposed to the pressures at the supply port and discharge port in a balanced condition when said main valve is seated, second valve means for controlling the pressure at the discharge port acting on the said one side of said main valve for creating a differential pressure condition across said main valve to unseat the same in response to the pressure at the supply port, and other valve means for shutting off the pressure at the supply port acting on one of said opposite areas upon the unseating of said main valve whereby the pressure at the discharge port will act on said other of said opposite areas of the main valve to maintain the same unseated to be opposed only by the pressure of said spring.*

*9. In an unloading valve, a supply port, a discharge port and a return port, a main valve normally seated to close communication between said supply port and return port and having a bore therethrough for the passage of fluid from said supply port to said discharge port, a check valve for blocking the return of fluid from said discharge port through said bore and arranged to be unseated when said main valve is seated and seated when said main valve is unseated, said main valve being subjected on the low pressure side thereof to the pressure at the discharge port tending to seat said valve and subjected on the high pressure side thereof to the pressure at the discharge port tending to seat said valve and subjected on the high pressure side thereof to the pressure at the supply port tending to unseat said valve, a spring urging said valve to seated position, said valve having additional opposite surface areas thereon exposed to the pressures at the supply port and discharge port in a balanced condition when said main valve is seated, second valve means for controlling the pressure at the discharge port acting on the said one side of said main valve for creating a differential pressure condition across said main valve to unseat the same in response to the pressure at the supply port, and other valve means for shutting off the pressure at the supply port acting on one of said areas upon the unseating of said main valve whereby the pressure at the discharge port will act on said other of said areas on the main valve to maintain the same unseated and to be opposed only by the pressure of said spring.*

*10. In an unloading valve, a supply port, a discharge port and a return port, a main valve normally seated to close communication between said supply port and return port and subjected on one side thereof to the pressure at the supply port tending to unseat said valve and subjected on the other side thereof to the pressure at the discharge port tending to seat said valve, a second valve for controlling the pressure at the discharge port acting on the said main valve, said second valve being subjected on one side to the pressure at the discharge port tending to seat said second valve to cut off said pressure from said discharge port which acts on the said main valve, a vent conduit for draining upon the seating of said second valve the pressure at said discharge port acting on the said main valve for creating a differential pressure condition thereacross to unseat the same in response to pressure at the supply port, a third valve for controlling said vent conduit arranged to be normally seated and subjected on one side to pressure at the discharge port tending to seat the same and engaged on the other side thereof by said second valve to be unseated thereby upon seating of said second valve and a spring supplementing the said fluid pressure acting on said third valve to oppose closing of said second valve whereby upon unseating of said third valve said pressure at the discharge port tending to seat said second valve will be opposed only by the pressure of said spring.*

*11. In an unloading valve, a supply port, a discharge port and a return port, a main valve normally seated to close communication between said supply port and return port and subjected on the high pressure side thereof to the pressure at the supply port tending to unseat said valve and subjected on the low pressure side thereof to the pressure at the discharge port tending to seat said valve, means including a second valve for controlling the said fluid pressure tending to seat said valve, a conduit to each side of said second valve for the flow of fluid under pressure therethrough, said second valve controlling said conduit and subjected on one side thereof to pressure in said conduit tending to move said second valve to shut off the flow of fluid through said conduit, a vent conduit from said conduit for draining the same upon the seating of said second valve, a third valve for controlling said vent conduit arranged to be normally seated and subjected on one side to the pressure in said conduit tending to seat said third valve and engaged on the other side thereof by said second valve to be unseated thereby upon seating of said second valve and a spring supplementing the said pressure acting on said third valve to oppose closing said second valve, said fluid pressure acting on said second valve tending to seat the same will be opposed only by the pressure of said spring.*

ROBERT STEVENSON.

References Cited in the file of this patent or the original patent

UNITED STATES PATENTS

| Number | Name | Date |
|---|---|---|
| 2,091,596 | Kuppel | Aug. 31, 1937 |
| 2,188,463 | Mercier | Jan. 30, 1940 |
| 2,241,665 | Herman | May 13, 1941 |
| 2,264,375 | Hill | Dec. 2, 1941 |
| 2,279,571 | Kane | Apr. 14, 1941 |
| 2,312,877 | Campbell | Mar. 2, 1943 |
| 2,327,942 | Thoresen | Aug. 24, 1943 |
| 2,404,102 | Schultz | July 16, 1946 |
| 2,410,751 | Schultz | Nov. 5, 1946 |
| 2,447,820 | Schultz | Aug. 24, 1948 |
| 2,545,712 | Stevenson | Mar. 20, 1951 |

FOREIGN PATENTS

| Number | Country | Date |
|---|---|---|
| 8,799 | Great Britain | May 3, 1895 |
| 267,978 | Great Britain | June 23, 1927 |
| 587,769 | Great Britain | Aug. 31, 1932 |